US012654946B2

(12) United States Patent
Steeb et al.

(10) Patent No.: US 12,654,946 B2
(45) Date of Patent: Jun. 16, 2026

(54) CONVEYING APPARATUS WITH INDEPENDENTLY MOVABLE PROTUBERANCES FOR FEEDING AND/OR ALIGNING WORKPIECES

(71) Applicant: HOMAG GmbH, Schopfloch (DE)

(72) Inventors: Marcel Steeb, Baiersbronn-Mitteltal (DE); Jonas Kalmbach, Freudenstadt (DE); Michael Thumm, Neustetten (DE); Michael Müller, Waldachtal (DE)

(73) Assignee: HOMAG GmbH, Schopfloch (DE)

( * ) Notice: Subject to any disclaimer, the term of this patent is extended or adjusted under 35 U.S.C. 154(b) by 143 days.

(21) Appl. No.: 18/688,611

(22) PCT Filed: Aug. 29, 2022

(86) PCT No.: PCT/EP2022/073901
§ 371 (c)(1),
(2) Date: Mar. 1, 2024

(87) PCT Pub. No.: WO2023/031090
PCT Pub. Date: Mar. 9, 2023

(65) Prior Publication Data
US 2024/0375879 A1 Nov. 14, 2024

(30) Foreign Application Priority Data
Sep. 2, 2021 (DE) ..................... 10 2021 122 721.6

(51) Int. Cl.
B65G 15/20 (2006.01)
B65B 35/24 (2006.01)
(Continued)

(52) U.S. Cl.
CPC ............ B65G 15/20 (2013.01); B65B 35/243 (2013.01); B65G 43/10 (2013.01); B65G 47/24 (2013.01);
(Continued)

(58) Field of Classification Search
CPC ........ B65G 15/20; B65G 43/10; B65G 47/24; B65G 2203/0233; B65G 2203/042; B65B 35/243
(Continued)

(56) References Cited

U.S. PATENT DOCUMENTS 3,352,403 A * 11/1967 Blake .................... B65B 35/243
198/728
10,182,528 B2 * 1/2019 Hasenour ............... A01D 61/02
(Continued)

FOREIGN PATENT DOCUMENTS

DE 202004007356 U1 9/2004
DE 102007028786 A1 12/2007
(Continued)

OTHER PUBLICATIONS

DE102007028786 (Espacenet English translation of the Description) (Year: 2007).*
(Continued)

*Primary Examiner* — Gene O Crawford
*Assistant Examiner* — Lester Rushin, III
(74) *Attorney, Agent, or Firm* — Morgan, Lewis & Bockius LLP

(57) ABSTRACT

The present disclosure relates to a conveying apparatus for conveying plate-shaped workpieces. The apparatus can include a workpiece rest, first protuberances, and drive units. The workpiece rest can be designed to allow horizontal movement of a workpiece resting thereon. The first protuberances can be spaced apart in a direction transverse to the
(Continued)

conveying direction and can be moved independently of one another. The first protuberances can be moved in the conveying direction and can displace the workpiece while bearing against the rear edge thereof. The drive units can move the first protuberances.

17 Claims, 2 Drawing Sheets

(51) Int. Cl.
  *B65G 43/10*     (2006.01)
  *B65G 47/24*     (2006.01)
(52) U.S. Cl.
  CPC ................ *B65G 2203/0233* (2013.01); *B65G 2203/042* (2013.01)
(58) Field of Classification Search
  USPC .......................................................... 198/604
  See application file for complete search history.

(56)                     References Cited

U.S. PATENT DOCUMENTS

| | | | | |
|---|---|---|---|---|
| 11,286,120 | B2 * | 3/2022 | Begin ................... | B65G 47/845 |
| 12,441,549 | B2 * | 10/2025 | Korte ..................... | B65G 17/08 |
| 2016/0144986 | A1 * | 5/2016 | Jauch ...................... | B65B 27/08 100/2 |
| 2017/0343483 | A1 * | 11/2017 | Piana ..................... | B65G 17/26 |
| 2021/0245974 | A1 * | 8/2021 | Hashizume ............ | B65G 54/02 |

FOREIGN PATENT DOCUMENTS

| | | | |
|---|---|---|---|
| DE | 102011003682 | A1 | 8/2012 |
| DE | 102011014495 | A1 | 9/2012 |
| DE | 102011075174 | A1 | 11/2012 |
| DE | 102011075176 | A1 | 11/2012 |
| DE | 102012004372 | A1 | 9/2013 |
| DE | 102014221008 | A1 | 4/2016 |
| DE | 102014225529 | A1 | 6/2016 |
| DE | 102014226965 | A1 | 6/2016 |
| DE | 102015203042 | A1 | 8/2016 |
| DE | 202015105148 | U1 | 1/2017 |
| DE | 102016225587 | A1 | 6/2018 |
| DE | 102017119084 | A1 | 2/2019 |
| EP | 1050388 | A2 | 11/2000 |
| EP | 1666198 | B1 | 3/2009 |
| EP | 2168714 | A1 | 3/2010 |
| EP | 3006352 | A1 | 4/2016 |
| EP | 3521219 | A1 | 8/2019 |
| EP | 3574761 | A1 | 12/2019 |
| EP | 2949439 | B1 * | 8/2021 ............. B27M 1/08 |

OTHER PUBLICATIONS

Search Report for German Application No. 102021122721.6, dated Nov. 1, 2022, 10 pages including machine translation.
International Search Report for International Application No. PCT/EP2022/073901, mailed Dec. 21, 2022, 4 pages including translation.
Beckhoff Automation Gmbh & Co KG, "Profitieren Sie von intelligenter Antriebstechnik. XTS. Das eXtended Transport System.", Beckhoff New Automation Technology, Sep. 2015, 73 pages including machine translation.

* cited by examiner

CONVEYING APPARATUS WITH INDEPENDENTLY MOVABLE PROTUBERANCES FOR FEEDING AND/OR ALIGNING WORKPIECES

CROSS-REFERENCE TO RELATED APPLICATIONS

This application is a U.S. National Phase of International Application No. PCT/EP2022/073901, filed Aug. 29, 2022, which is an international application designating the United States and claiming the benefit of and priority to German Application No. 102021122721.6, Sep. 2, 2021, each of which is hereby incorporated by reference in its entirety.

TECHNICAL FIELD

The invention relates to a conveying apparatus for conveying workpieces, in particular made of wood, wood-based materials, composite materials or similar materials, in particular for subsequent machining with a pass-through machine.

PRIOR ART

The feed of plate-shaped workpieces (e.g. 1250 mm×600 mm×25 mm) into machining devices for the transverse machining of a shorter workpiece side is often carried out using protuberances that are arranged on a conveyor chain according to defined spacing, such that there is always a minimum clearance (e.g. 1000 mm) between the front edges of two successive workpieces. In the case of a feed rate of 35 m/min, the cyclic output of the feed and machining is therefore limited to 35 workpieces/min. If the protuberances of one cycle are missed, the subsequent protuberances have to be waited for, as a result of which the cyclic output is further reduced.

In the case of higher feed rates there is the problem that during workpiece transportation the protuberances strike the rear edge of the initially stationary workpiece at a constant high speed and can damage it as a result, which is problematic particularly in the case of workpieces with edges that have already been machined (e.g. glued longitudinal edges).

In addition, the workpiece must be aligned centrally prior to being fed to the machining device so as to ensure a uniform machining allowance on both sides.

Various apparatuses and methods for aligning, feeding and/or machining plate-shaped workpieces are known from the prior art. An apparatus and a method for aligning and feeding with the help of conveyor belts, clamp rollers and alignment guides is described in DE 10 2014 221 008 A1, for example. Alignment apparatuses and methods with protuberances located on conveyor belts are known from DE 20 2015 105 148 U1 and DE 10 2016 225 587 A1.

SUBJECT MATTER OF THE INVENTION

The present invention is based on the object of providing a workpiece feed having an improved cyclic output.

A conveying apparatus according to the invention is described in claim 1. A method according to the invention is specified in claim 11. Further preferred embodiments can be found in the subclaims.

A conveying apparatus according to the invention comprises a workpiece rest, in particular a roller conveyor, roller rail or air cushion device, which is designed to allow horizontal movement of a workpiece resting thereon, first protuberances, which are spaced apart in a direction transverse to the conveying direction, can be moved in the conveying direction and are designed to displace the workpiece in the conveying direction while bearing against the rear edge thereof, and drive units, which are designed to move the first protuberances, wherein the first protuberances can be moved independently of one another.

Since the first protuberances can be moved independently of one another, the movement of individual first protuberances can be individually adjusted for each workpiece. For instance, protuberances that already bear against the rear edge of a workpiece can be moved at a constant high speed so as to convey the workpiece at the maximum feed rate, while protuberances that are located further back in the conveying direction and do not yet bear against the rear edge of a workpiece move toward the rear edge of the workpiece at a low differential speed so as to prevent damage, and are then accelerated so as to convey the workpiece at the maximum feed rate. This allows a high cyclic output to be realized, without the workpiece edges being damaged or additional pre-accelerators being required.

Moreover, the spacing between the front edges of two successive workpieces can be individually adjusted. For example, instead of constant spacing between the front edges of two workpieces, constant spacing between the rear edge of a front workpiece and the front edge of a rear workpiece can be set. This allows the cycle times of shorter workpieces (in the conveying direction) (smaller than 600 mm, for example) to be shortened while maintaining the feed rate, as a result of which the overall cyclic output can be increased. Alternatively, the feed rate can also be reduced while maintaining the cyclic output, as a result of which the machining quality of the individual workpieces can be improved. Increased cyclic output can be achieved in this way.

A further advantage of the independent movability of the first protuberances is that the workpieces can be aligned to the front or rear edge.

Preferably, the conveying apparatus comprises second protuberances, which are spaced apart in a direction transverse to the conveying direction, which can be moved in the conveying direction and are designed to clamp the workpiece by the second protuberances bearing against the front edge of the workpiece and the first protuberances bearing against the rear edge of the workpiece, wherein the second protuberances can be moved independently of one another, and in particular independently of the first protuberances.

With the help of the second protuberances, which clamp the workpiece by bearing against the front edge thereof, it can be ensured that the workpiece does not slip out of position while being moved by the first protuberances. Furthermore, the second protuberances can facilitate the alignment of the workpieces at the front edge thereof.

Preferably, the conveying apparatus in each case comprises a plurality of first and/or second protuberance pairs. The use of a plurality of protuberance pairs allows a plurality of workpieces to be simultaneous conveyed and/or aligned (in succession), as a result of which the cyclic output of the conveying apparatus can be increased.

Preferably, the conveying apparatus comprises a first sensor for determining a position of a workpiece.

The first sensor makes it possible, for example, to identify when the conveying apparatus is fed a workpiece from an upstream infeed device, so as to initiate the conveyance of the workpiece by way of a corresponding movement of the protuberances. Both the front edge and the rear edge of the workpiece can be identified, such that at a known feed rate the width of the workpiece in the conveying direction can be determined and therefore the spacing between two successive workpieces can be optimized. In addition, further sensors can be provided for determining a position of a workpiece, which detect, for example, whether the workpiece has been correctly positioned and/or aligned, as a result of which the process stability can be improved.

Preferably, the conveying apparatus comprises a second sensor for determining a position of one or more protuberances.

The second sensor makes it possible to identify deviations between the current position of individual protuberances and the target position thereof, and to take these into account when moving the protuberances, for example by way of referencing or a dynamic control of the protuberance position. Referencing is required, in particular, when the protuberance position in relation to the moving part (magnet) of the cam drive is changed, so as to be able to convey particularly narrow workpieces, for example. In addition, a dynamic control can compensate for inaccuracies of the cam drive, as a result of which the requirements as to the accuracy of the drive, and therefore costs, can be reduced and/or the positional accuracy of the workpieces can be improved.

Preferably, the drive units have linear motors with movable magnets, wherein the magnets can preferably be moved in a circulating manner, and it is further preferable for the position of the protuberances in relation to the magnets to be adjustable.

The use of linear motors with movable magnets has proven to be particularly suitable for realizing a conveying apparatus with individually movable protuberances.

The use of magnets that can be moved in a circulating manner is particularly advantageous since they do not have to be moved back to the original position in the same way after conveying; instead, they can be moved back in a circular course outside of the conveying path. This allows continuous and therefore efficient conveying, particularly when conveying a plurality of successive workpieces.

As a result of the adjustability of the protuberance positions in relation to the moving magnets, limitations due to the dimensions of the magnets can be reduced, such that, for example, even particularly narrow workpieces can be conveyed, by the first (rear) protuberances being positioned on the corresponding magnets further forward in the conveying direction and the second (front) protuberances being positioned on the corresponding magnets further back in the conveying direction. The first (rear) protuberances can also be positioned further back in the conveying direction and the second (front) protuberances can also be positioned further back in the conveying direction. For other workpieces, further protuberance positions are also conceivable.

Preferably, the first protuberances and/or the second protuberances can be moved in a position-controlled and/or force-controlled manner.

A position-controlled movement allows accurate positioning of the protuberances. In the case of position-controlled first protuberances, the rear edge of a workpiece is therefore accurately positioned, while in the case of position-controlled second protuberances the front edge of a workpiece is accurately positioned. A force-controlled movement allows reliable clamping of the workpiece between the first and second protuberances with a defined clamping force, such that the workpiece can be prevented from slipping out of position on account of too low a clamping force and damage to the workpiece edges on account of too high a clamping force can also be prevented.

Thus, in order to accurately position and at the same time securely clamp a workpiece, it is particularly advantageous if either the first protuberances are moved in a position-controlled manner and the second protuberances in a force-controlled manner, or if the first protuberances are moved in a force-controlled manner and the second protuberances in a position-controlled manner. Moreover, it is advantageous if the respective protuberances can alternate between a position-controlled movement and a force-controlled movement as required, so as to align a workpiece at the front or rear edge, for example.

Preferably, the first protuberances and/or the second protuberances are further designed to align the workpiece.

Since the two protuberances of the first protuberance pair, which bear against the rear edge of a workpiece, or the two protuberances of the first and second protuberance pair, which clamp a workpiece, are each moved to varying extents in the conveying direction, the workpiece can be rotated in the horizontal plane. In addition, the first and/or second protuberances can be moved in such a way that the rear edge of the workpiece is not aligned exactly perpendicular to the conveying direction. A lateral guide can limit movement of the workpiece in a direction transverse to the transport direction and thereby prevent the workpiece from falling down to the side. It is advantageous if the frictional resistance in the transverse direction is reduced, for example by way of a low-friction workpiece rest and/or rotatably mounted protuberances. Furthermore, provision can be made for the workpiece to be pushed laterally against said guide during movement in the conveying direction and be thereby aligned.

The integration of the alignment process into the conveying process and the resulting omission of corresponding interfaces results in the workpieces only having to be fed at the fixed side of the subsequent device.

For example, workpieces on a first device can initially be moved in the longitudinal direction and those on a second device can be moved in a transverse direction.

There is also the possibility of moving the workpieces on a first device in a transverse direction and those on a second device in a longitudinal direction. This is particularly advantageous since the workpieces can always be fed in at the fixed side of the device in longitudinal operation as a result of the variable front/rear edge orientation.

Preferably, the conveying apparatus is designed to receive workpieces from an infeed device, in particular a roller conveyor or a magazine, in particular by the workpieces being clamped on a conveyor belt or a conveyor chain in the vertical direction, i.e. from above, for example with rollers or belts, and moved along at a defined speed.

The integration with an upstream infeed device for providing workpieces facilitates the automated receiving and conveyance of workpieces and therefore a continuous material flow, as a result of which the cyclic output of the entire process can be improved. Roller conveyors and magazines are conventional infeed devices that are also particularly suitable for being combined with the conveying apparatus according to the invention, preferably by the workpieces being clamped from above and fed to the conveying apparatus, where they are "taken" by the protuberances of the conveying apparatus and moved along. This type of feed is simple to implement and is compatible with both apparatuses. Alternatively, other types of feed can also be used.

Preferably, the conveying apparatus is designed to feed workpieces to a machining device, in particular a wood machining device.

The integration with a downstream machining device facilitates an automated conveyance and machining of the workpieces and therefore a continuous material flow, as a result of which the cyclic output of the entire process can be improved, particularly when the timing of the two apparatuses is coordinated. On account of their dimensions and material properties, workpieces made of wood or wood-based materials are particularly suitable for the conveying apparatus according to the invention. In addition, the cyclic output of the conveying apparatus according to the invention can easily be coordinated with the cyclic output of conventional wood machining devices.

A method as according to the invention for aligning and conveying workpieces, in particular with a conveying apparatus as described above, comprises the steps of: moving the first protuberances until they bear against the rear edge of the workpiece, independently moving the first protuberances so as to align the workpiece, and moving the first protuberances in a synchronized manner so as to convey the aligned workpiece.

As a result of moving the first protuberances in a purposeful manner until they bear against the rear edge of a workpiece, preferably at a lower differential speed than the conveying speed (in particular, the rear edge of the workpiece is approached at a low differential speed), the first protuberances can be prevented from suddenly colliding with the rear workpiece edge and thereby causing damage. Subsequently, the workpiece can be aligned by way of independently moving the first protuberances without an additional apparatus or interruption of the material flow. The aligned workpiece can then be conveyed by way of moving the first protuberances in a synchronized manner and can be fed to a machining device, for example. The alignment can also take place during conveyance, as a result of which the cycle time can be reduced.

The workpiece can be aligned at the front edge by the first protuberances being moved in a force-controlled manner and the second protuberances being moved in a position-controlled manner, the first protuberances hitting the rear edge of the workpiece and displacing and/or rotating it in such a way that the front edge of the workpiece bears against the position-controlled second protuberances, while the force-controlled first protuberances bear against the rear edge of the workpiece and clamp said workpiece.

For the alignment at the front edge, a defined force is exerted on the workpiece rear edge by the first protuberances, as a result of which the workpiece is pushed forward in the direction of the second protuberances until it bears against them with its front edge. Thus, the second protuberances serve as a stop for the workpiece front edge, which can therefore be accurately positioned. Since the first protuberances also exert a defined force on the workpiece rear edge, the workpiece is securely held between the first and second protuberances, as a result of which the workpiece can be prevented from slipping out of position or being damaged.

The workpiece can be aligned at the rear edge by the first protuberances being moved in a position-controlled manner and the second protuberances being moved in a force-controlled manner, the first protuberances hitting the rear edge of the workpiece and displacing and/or rotating it in such a way that the rear edge of the workpiece bears against the position-controlled first protuberances, while the force-controlled second protuberances bear against the front edge of the workpiece and clamp said workpiece.

For the alignment at the rear edge, the first protuberances move toward the workpiece rear edge until they bear against it and push the thereby aligned workpiece further forward in the direction of the second protuberances, which are thereby also pushed forward and in the process exert a defined counterforce on the workpiece front edge. Thus, the first protuberances serve as a stop for the workpiece rear edge, which can therefore be accurately positioned. The workpiece is securely held between the first and second protuberances by way of the force-controlled second protuberances, as a result of which the workpiece can be prevented from slipping out of position or being damaged.

Preferably, a position of a workpiece is detected by a first sensor and the protuberances are moved as a function of the detected position.

As a result of the position detection, it can be identified, for example, when the conveying apparatus is fed a workpiece from an upstream infeed device, so as to initiate the conveyance of the workpiece by way of a corresponding movement of the protuberances. Both the front edge and the rear edge of the workpiece can be identified, such that at a known feed rate the width of the workpiece in the conveying direction can be determined and therefore the spacing between two successive workpieces can be optimized. In addition, further sensors can be provided for determining a position of a workpiece, which detect, for example, whether the workpiece has been correctly positioned and/or aligned, as a result of which the process stability can be improved.

Preferably, a position of one or more protuberances is detected by a second sensor and the protuberances are moved as a function of the detected position.

As a result of the position detection, deviations between the current position of individual protuberances and the target position thereof can be identified and taken into account when controlling the protuberances, for example by way of referencing or dynamic control of the protuberance position. Referencing is required, in particular, when the protuberance position in relation to the moving part (magnet) of the cam drive is changed, so as to be able to convey particularly narrow workpieces, for example. A dynamic control can compensate for inaccuracies of the cam drive, as a result of which the requirements as to the accuracy of the drive, and therefore costs, can be reduced and the positional accuracy of the workpieces can be improved.

Preferably, a plurality of workpieces are conveyed one after the other and the protuberances are moved in such a way that there is a constant spacing between the individual workpieces.

In contrast to a conventional conveyor with constant front edge spacing, a conveyer with constant intermediate spacing offers the advantage that the cycle times of shorter workpieces (in the conveying direction) (in particular <600 mm) can be shortened while maintaining the same feed rate, as a result of which the overall cyclic output can be increased. Alternatively, the feed rate can also be reduced while maintaining the cyclic output, as a result of which the machining quality of the individual workpieces can be improved.

BRIEF DESCRIPTION OF THE DRAWINGS

Further features and advantages of an apparatus, a use and/or a method are revealed by the following description of embodiments with reference to the enclosed drawings.

In these drawings.

DESCRIPTION OF EMBODIMENTS

Identical reference numbers specified in different figures designate identical, corresponding or functionally similar elements.

Figures 1, 2A:
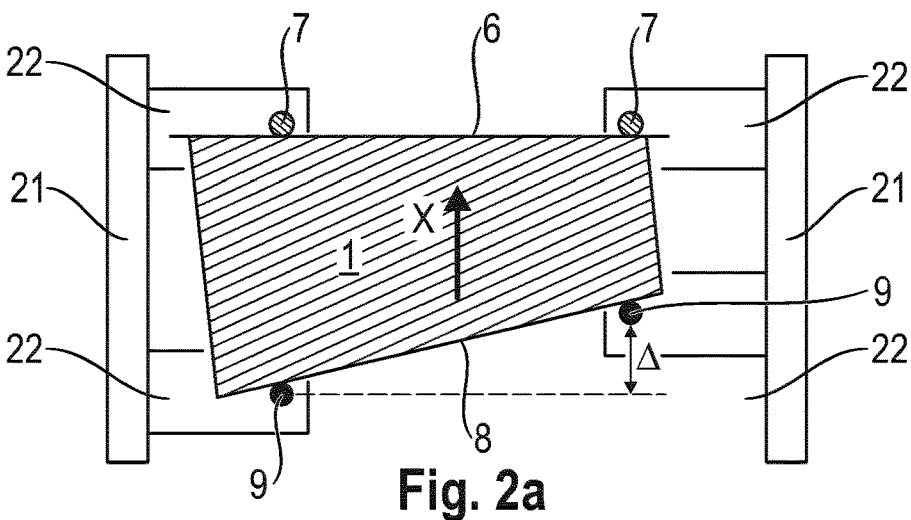
FIG. 1 shows a schematic plan view of an embodiment of a conveying apparatus according to the invention.
FIG. 2*a* shows an enlarged section for illustrating the alignment of a workpiece at the front edge.

FIG. 1 shows a schematic plan view of an embodiment of the conveying apparatus 100 according to the invention. This comprises a workpiece rest 11 in the form of two roller conveyors arranged in parallel, on which long, plate-shaped workpieces 1 rest transversely and can be moved in a conveying direction X. Located laterally outside of the workpiece rest 11 are two drive units 20, which each comprise circulating linear motors 21 with a conveying area 14 and a return area 16 as well as a plurality of magnets 22 guided in a circulating manner, which can be moved along the respective linear motors 21 independently of one another. Provided on each of the magnets 22 is a protuberance 9, 7, the position of which on the magnets 22 can be set in advance (see FIG. 3).

Upstream of the conveying apparatus 100 is an infeed device 2 in the form of an inclined roller conveyor, via which the workpieces 1 are provided to the conveying apparatus 100, wherein the workpieces 1 can also be aligned in an inclined manner on account of tolerances. Although the roller conveyor in the present embodiment is configured to be inclined, it can also be flat.

The provided workpieces 1 are clamped on a conveyor belt or a conveyor chain 3 from above, with clamp rollers 4. If there is a jam, the backed-up workpieces 1 can be separated again with the help of a timing guide 19 or alternatively with the help of a cam belt which runs along the conveyor belt or conveyor chain 3.

If a first sensor 5 detects the front edge 6 of a workpiece 1, the protuberances 7 in front, which will be referred to in the following as second protuberances or counterholders, will be accelerated and moved in the conveying direction X with defined spacing from the front edge 6 of the workpiece 1. As soon as the first sensor 5 detects the rear edge 8 of the workpiece 1, the protuberances 9 behind, which will be referred to in the following as first protuberances or pushers, move toward the rear edge 8 of the workpiece 1 and synchronize themselves in a position-controlled manner to the second protuberances 7, as a result of which the workpiece 1 is aligned straight at the rear edge 8. Alternatively, the workpiece can also be aligned at the front edge 6 (see FIGS. 2*a* and 2*b*).

This sets a constant gap 10 between the (rear) first protuberances 9 of a first workpiece 1 and the (front) second protuberances 7 of a second, subsequent workpiece 1, which gap is referred to in the following as "intermediate spacing".

Before a workpiece 1 is pushed under the top roll pressure unit, it is aligned during transport in a direction transverse to the conveying direction X with the help of aligning stations 12 so as to provide a substantially identical machining allowance on both sides. Subsequently, the workpiece 1 is clamped between the two first protuberances 9 and the two second protuberances 7.

Downstream of the conveying apparatus 100 is a machining device 13, which takes the aligned workpieces 1. Once a workpiece 1 has been passed to the device 13, the second protuberances 7 accelerate away from the front edge 6 into the return area 16. If the rear edge 8 of the workpiece 1 has also left the conveying area 14, the first protuberances 9 also move into the return area 16. In order to ensure a continuous flow, further protuberances are located in the return area 16. In addition, the first and second protuberances 9, 7 can be individually referenced on both sides with the help of a second sensor 18 so as to synchronize them.

The conveying apparatus 100 can also be designed for single-sided workpiece machining. For this, a plurality of circulating drive units 20 arranged side-by-side is required, wherein the travel movement of the protuberances 9, 7 is preferably not horizontal but vertical.

Furthermore, the conveying apparatus 100 can also be designed to convey workpieces longitudinally. For this, all of the protuberances 9, 7 are parked in the return 16 and the aligning stations 12 are deactivated. With the help of inclined, driven rollers 15, when moving in the conveying direction X the workpiece 1 is simultaneously pushed laterally against a guide 17 and is thereby aligned.

Moreover, the workpieces 1 can be fed not only from the front via an upstream infeed device 2 but also from the side via a magazine, for example. In this case, the protuberances 9, 7 extract the workpiece 1 from a stack. To machine folded parts, the protuberances 9, 7 can also be configured to be variable in height.

Figure 2B:
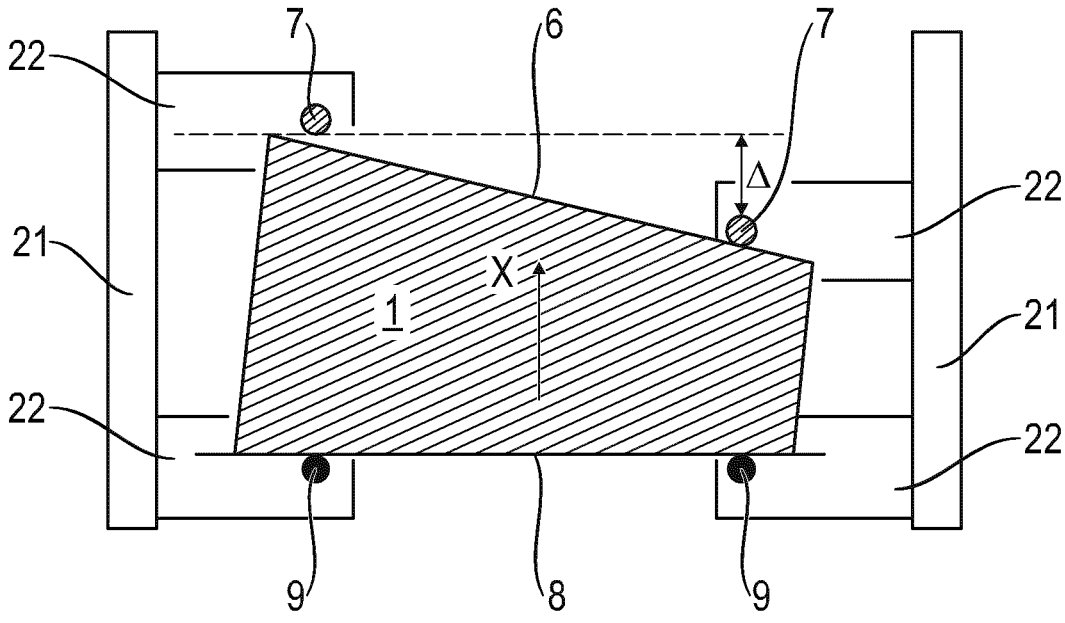
FIG. 2*b* shows an enlarged section for illustrating the alignment of a workpiece at the rear edge.

FIG. 2*a* and FIG. 2*b* show enlarged schematic plan views of a conveying apparatus according to the invention to illustrate the alignment of a workpiece at the front/rear edge.

In the case of the front edge alignment as shown in FIG. 2*a*, the first protuberances 9 switch from position-controlled to force-controlled. The workpiece is pushed to the second, position-controlled protuberances 7 and is thereby clamped between the first protuberances 9 and the second protuberances 7. In the example shown, the second protuberances 7 are moved to the same extent in the conveying direction X and the first protuberances 9 are moved in the conveying direction X until the front edge 6 of the workpiece 1 bears against the second protuberances 7 and the resulting counterforce on the first protuberances 9 increases to a defined value. If the front edge 6 and the rear edge 8 of the workpiece 1 are not parallel to one another, the first protuberances 9 are therefore moved to varying extents in the conveying direction X.

In the case of the rear edge alignment shown in FIG. 2*b*, the first protuberances 9 already bear against the rear edge 8 of the workpiece 1 in a position-controlled manner. The second protuberances 7 bear against the front edge 6 of the workpiece 1 in a force-controlled manner, such that the workpiece 1 is clamped between the first and second protuberances 9, 7. In the example shown, the first protuberances 9 are moved to the same extent in the conveying direction X and the second protuberances 7 are moved at a slower speed until they bear against the front edge 6 of the workpiece 1 and the resulting counterforce increases to a defined value. If the front edge 6 and the rear edge 8 of the workpiece 1 are not parallel to one another, the second protuberances 7 are therefore moved to varying extents in the conveying direction X or are moved in the opposite direction.

Figure 3:
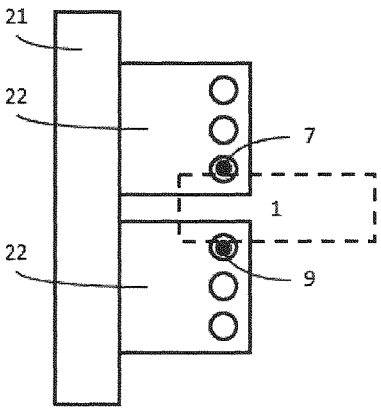
FIG. 3 shows an enlarged section for illustrating the fixing of the protuberances onto the magnets.

FIG. 3 shows an enlarged schematic plan view of a conveying apparatus 100 according to the invention to illustrate the fixing of the protuberances 9, 7 onto the magnets 22. The magnets 22 have a plurality of fixing means (e.g. holes) for fixing the protuberances 9, 7. Thus, the position of the protrusion on the magnet 22 can be varied as required. In the case of particularly narrow workpieces 1, it may, for example, be advantageous to position the (rear) first protuberances as far forward as possible and to position the front second protuberances 7 as far back as possible on the respective magnets 22. The relative position of the protuberances 9, 7 in relation to the magnets 22 can, for example, be detected automatically via a second sensor 18 and can therefore be taken into account for movement control. The first (rear) protuberances can also be positioned further back in the conveying direction and the second (front) protuberances can also be positioned further back in the conveying direction. For other workpieces, further protuberance positions are also conceivable.

It is clear to the person skilled in the art that individual features described in different embodiments can also be implemented in a single embodiment, provided they are not structurally incompatible. Similarly, various features described in the context of a single embodiment can also be provided in several embodiments, either individually or in any suitable sub-combination.

REFERENCE NUMBERS

1 Workpiece
2 Infeed device
3 Conveyor belt/chain
4 Clamp roller
5 First sensor
6 Front edge
7 Second protuberances
8 Rear edge
9 First protuberances
10 Intermediate spacing
11 Roller conveyor
12 Aligning station
13 Machining device
14 Conveying area
15 Inclined, driven rollers
16 Return area
17 Alignment guide
18 Second sensor
19 Timing guide
20 Drive unit
21 Linear motors
22 Magnet

The invention claimed is:

1. Conveying apparatus for conveying workpieces in a conveying direction, comprising:
a workpiece rest, which is designed to allow movement of a workpiece resting thereon,
first protuberances, which are spaced apart in a direction transverse to the conveying direction, can be moved in the conveying direction and are designed to displace the workpiece while bearing against the rear edge thereof, and
drive units, which are designed to move the first protuberances,
wherein the first protuberances can be moved independently of one another,
wherein the first protuberances are further configured to align the workpiece,
wherein the drive units have linear motors with movable magnets.

2. Conveying apparatus according to claim 1,
wherein the conveying apparatus further comprises:
second protuberances, which are spaced apart in a direction transverse to the conveying direction, can be moved in the conveying direction and are designed to clamp the workpiece by the second protuberances bearing against the front edge thereof and the first protuberances bearing against the rear edge thereof,
wherein the second protuberances can be moved independently of one another, and independently of the first protuberances.

3. Conveying apparatus according to claim 1,
wherein the conveying apparatus in each case comprises a plurality of first and/or second protuberance pairs.

4. Conveying apparatus according to claim 1,
wherein the conveying apparatus further comprises:
a first sensor for determining a position of a workpiece.

5. Conveying apparatus according to claim 1,
wherein the conveying apparatus further comprises:
a second sensor for determining a position of one or more protuberances.

6. Conveying apparatus according to claim 1,
wherein the first protuberances and/or the second protuberances can be moved in a position-controlled and/or force-controlled manner.

7. Conveying apparatus according to claim 1,
wherein the second protuberances are further designed to align the workpiece.

8. Conveying apparatus according to claim 1,
wherein the conveying apparatus is designed to receive workpieces from an infeed device by the workpieces being clamped on a conveyor belt or a conveyor chain in a vertical direction, and moved along at a defined speed.

9. Conveying apparatus according to claim 1,
wherein the conveying apparatus is designed to feed workpieces to a wood machining device.

10. Method for aligning and conveying workpieces with a conveying apparatus according to claim 1, comprising the steps of
moving the first protuberances until they bear against the rear edge of the workpiece,
independently moving the first protuberances so as to align the workpiece, and
moving the first protuberances in a synchronized manner so as to displace the aligned workpiece in the conveying direction.

11. Method according to claim 10, wherein the workpiece is aligned at the front edge, by
the first protuberances being moved in a force-controlled manner and the second protuberances being moved in a position-controlled manner, and
the first protuberances hitting the rear edge of the workpiece and the workpiece being displaced and/or rotated in such a way that the front edge of the workpiece bears against the position-controlled second protuberances, while the force-controlled first protuberances bear against the rear edge of the workpiece and clamp said workpiece.

12. Method according to claim 10, wherein the workpiece is aligned at the rear edge, by
the first protuberances being moved in a position-controlled manner and the second protuberances being moved in a force-controlled manner,
the first protuberances hitting the rear edge of the workpiece and the workpiece being displaced and/or rotated in such a way that the rear edge of the workpiece bears against the position-controlled first protuberances, while the force-controlled second protuberances bear against the front edge of the workpiece and clamp said workpiece.

13. Method according to claim 10 wherein a position of a workpiece is detected by a first sensor and the protuberances are moved as a function of the detected position.

14. Method according to claim 10 wherein a position of one or more protuberances is detected by a second sensor and the protuberances are moved as a function of the detected position.

15. Method according to claim 10 wherein a plurality of workpieces is simultaneously conveyed in succession and the protuberances are moved in such a way that there is a constant spacing between the individual workpieces.

16. Conveying apparatus according to claim 1, wherein the workpiece rest is a roller conveyor, roller rail or air cushion device.

17. Conveying apparatus according to claim 1, wherein the magnets can be moved in a circulating manner, and the position of the protuberances in relation to the magnets is adjustable.

\*　\*　\*　\*　\*